Feb. 9, 1971   J. J. JACOBSON   3,562,796

FOLDABLE READING STAND OF ALL WIRE

Filed Oct. 31, 1968   2 Sheets-Sheet 1

INVENTOR
JAMES J. JACOBSON
BY
ATTORNEY

Feb. 9, 1971  J. J. JACOBSON  3,562,796
FOLDABLE READING STAND OF ALL WIRE
Filed Oct. 31, 1968  2 Sheets-Sheet 2

INVENTOR
JAMES J. JACOBSON
BY
ATTORNEY

//+ # United States Patent Office 3,562,796
Patented Feb. 9, 1971

3,562,796
FOLDABLE READING STAND OF ALL WIRE
James J. Jacobson, New York, N.Y., assignor to Wahl Associates, Inc., Long Island City, N.Y.
Filed Oct. 31, 1968, Ser. No. 782,505
Int. Cl. A47b 23/00
U.S. Cl. 248—456            8 Claims

ABSTRACT OF THE DISCLOSURE

A foldable reading stand of all wire structure has a base portion of wire structure and a book supporting portion of wire structure rotatably mounted on the base portion. The book supporting portion comprises a book back supporting structure rotatably mounted on the base portion and a book bottom supporting part rotatably mounted on the book back supporting wire structure.

DESCRIPTION OF THE INVENTION

The present invention relates to a foldable reading stand. More particularly, the invention relates to a foldable reading stand of all wire structure.

The principal object of the present invention is to provide a new and improved foldable reading stand.

An object of the present invention is to provide a foldable reading stand which is simple in structure and is operated with facility and rapidity and without distraction.

An object of the present invention is to provide a foldable reading stand which is strong, reliable and durable in structure.

An object of the present invention is to provide a foldable reading stand which is rigid, lightweight and stable against tipping.

An object of the present invention is to provide a foldable reading stand which securely supports and positions large and small books, light and heavy books, newspapers, magazines, music sheets, pads, pamphlets, single or multiple sheets, or the like.

An object of the present invention is to provide a foldable reading stand which protects reading material supported by it from damage.

An object of the present invention is to provide a foldable reading stand which supports reading material in any desired position with facility and rapidity.

An object of the present invention is to provide a foldable reading stand which is satisfactorily, facilely and rapidly utilizable with all sizes and weights of reading material.

An object of the present invention is to provide a foldable reading stand which effectively controls book and page movement.

An object of the present invention is to provide a foldable reading stand which is attractive in appearance.

An object of the present invention is to provide a foldable reading stand which reduces reading fatigue and distraction and facilitates pleasure and serious reading.

An object of the present invention is to provide a foldable reading stand which encourages relaxed reading and provides manual freedom for the reader.

An object of the present invention is to provide a foldable reading stand which permits fine adjustable angular positioning with facility and rapidity, and without props, ratchets, thumbscrews, or the like.

An object of the present invention is to provide a foldable reading stand which is foldable to a compact thin size not much larger than a thin book.

An object of the present invention is to provide a foldable reading stand which is rugged enough to last a lifetime.

An object of the present invention is to provide a foldable reading stand which positions any type of reading material at any desired angle in any stationary or moving environment.

An object of the present invention is to provide a foldable reading stand which is readily foldable and conveniently transported.

An object of the present invention is to provide a foldable reading stand which functions as a music stand and includes extension arms for supporting sheet music, newspapers, or the like.

An object of the present invention is to provide a foldable reading stand which functions as a lap easel, bed easel, lecturn, table stand, or the like.

An object of the present invention is to provide a foldable reading stand which functions as a portable table stand for positioning full sized musical scores with pages flat open and unaffected by drafts, yet turnable instantly and with facility.

In accordance with the present invention, a foldable reading stand of all wire structure comprises a base portion of wire structure and a book supporting portion of wire structure rotatably mounted on the base portion. The book supporting portion comprises a book back supporting wire structure rotatably mounted on the base portion and a book bottom supporting part rotatably mounted on the book back supporting wire structure. A book back positioning device has a first member mounted on the book back supporting structure and a second member mounted on the base portion. The first and second members cooperate with each other to position the book back supporting structure at a selected one of a plurality of angles with the plane of the base portion.

A pair of page arrestors are pivotally mounted at opposite ends of the book bottom supporting part for applying page holding pressure. Each of the page arrestors is rotatable toward and away from the other in a manner whereby each page of an open book resting on the book supporting portion is arrested in open position at a selected point thereon.

A pair of extension arms are pivotally mounted at spaced points on the book back supporting structure. Each of the extension arms is rotatable toward and away from the other in a manner whereby the book back supporting structure is adapted to support sheets of large size.

The base portion comprises a substantially rigid wire of rectangular configuration having rounded corners and a substantially rigid support wire extending parallel to one pair of front and back parallel sides of the wire and affixed at its ends to corresponding ones of the other pair of left and right parallel sides of the wire perpendicular to the one pair of sides at a large distance from the back side of the wire and at a small distance from the front side of the wire.

The book back supporting structure of the book supporting portion comprises a substantially rigid wire of U-shaped configuration having a pair of spaced parallel legs joined by a cross arm at rounded corners. Each of the legs at its free end is folded over on itself around the support wire of the base portion adjacent the left and right sides of the base portion to form a closed loop to permit free rotation of the book supporting portion about the support wire. The book back supporting structure of the book supporting portion further comprises a substantially rigid first bottom wire extending parallel to the cross arm of the book back wire and affixed at its ends to corresponding ones of the legs of the book back wire adjacent the loops formed therein and at a corresponding front surface segment of each of the legs. A substantially rigid second bottom wire extends parallel to the first bottom wire and is affixed at its ends to corresponding ones of the legs of the book back wire adjacent and slightly farther distant from the loops formed therein and at a corresponding back surface segment of each of the legs. The second bottom wire is bent to form an angle in itself near each of the legs of the book back supporting structure.

The book bottom supporting part of the book supporting portion comprises a substantially rigid wire of U-shaped configuration having a pair of spaced parallel legs joined by a cross arm at rounded corners. Each of the legs at its free end is folded over on itself around the second bottom wire of the book back supporting structure between the angle formed therein and the corresponding leg of the book back supporting structure to form a closed loop to permit free rotation of the book bottom supporting part between the plane of the book back supporting structure and the points of contact of the legs of the book bottom supporting part and the first bottom wire of the book back supporting structure. The book bottom supporting part of the book supporting portion further comprises a sheet of material affixed to the wire of the book bottom supporting part and extending beyond the legs of the book bottom supporting part. The sheet of material of the book bottom supporting part is folded over on itself at each of the edges of the parts thereof extending beyond the legs of the book bottom supporting part to form a closed sleeve.

The pair of page arrestors are each pivotally mounted in a corresponding one of the sleeves formed in the sheet of material for applying page holding pressure. Each of the page arrestors is rotatable toward and away from the other in a manner whereby each page of an open book resting on the book supporting portion is arrested in open position at a selected point thereon. The pair of extension arms are pivotally mounted at the corners of the book back supporting structure. Each of the extension arms is rotatable toward and away from the other in a manner whereby the book back supporting structure is adapted to support sheets of large size.

The book back supporting structure of the book supporting portion further comprises a substantially rigid intermediate wire extending parallel to the cross arm of the book back wire and affixed at its ends to corresponding ones of the legs of the book back wire approximately half way between the second bottom wire and the cross arm of the book back supporting structure. The book back positioning device has a first member rotatably mounted on the intermediate wire of the book back supporting structure and a second member affixed at one end to the support wire of the base portion and at its other end to the back side of the base portion. The first and second members cooperate with each other to position the book back supporting structure at a selected one of a plurality of angles with the plane of the base portion. The first member of the book back positioning device comprises a substantially rigid wire of U-shaped configuration having a pair of spaced parallel legs joined by a cross arm at rounded corners. Each of the legs at its free end is folded over on itself around the intermediate wire of the book back supporting structure to form a closed loop to permit free rotation of the first member about the intermediate wire. The second member of the book back positioning device is parallel to the left and right sides of the base portion and approximately half way between the left and right sides and has a plurality of transverse notches formed therein at spaced intervals along its length for accommodating the cross arm of the first member.

In order that the present invention may be readily carried into effect, it will now be described with reference to the accompanying drawings, wherein.

In the figures, the same components are identified by the same reference numerals.

The foldable reading stand of the present invention comprises a base portion of wire structure and a book supporting portion of wire structure rotatably mounted on the base portion.

The base portion comprises a substantially rigid wire 11 of rectangular configuration (FIGS. 1 and 5) having rounded corners. The base portion comprises a pair of front and back parallel sides 12 and 13, respectively, of the wire 11 rectangle (FIGS. 1, 2 and 3) and a pair of left and right parallel sides 14 and 15, respectively, of said wire (FIGS. 1 and 5) perpendicular to said front and back sides.

Figures 1, 3, 4:
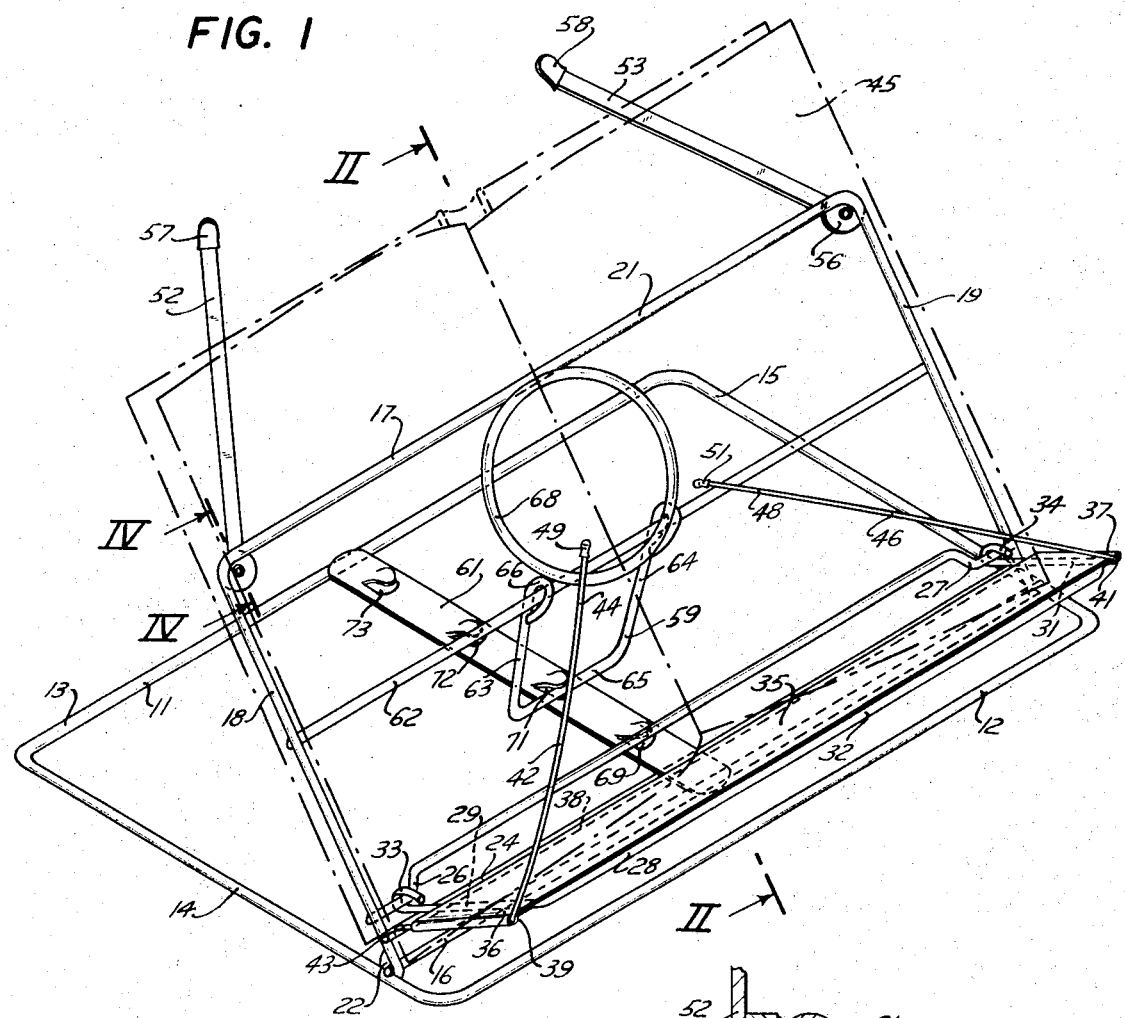
FIG. 1 is a perspective view of an embodiment of the foldable reading stand of the present invention in operating condition.
FIG. 3 is a view, partly in section, taken along the lines III—III of FIG. 2.
FIG. 4 is a sectional view, taken along the lines IV—IV of FIG. 1.
Figure 5:
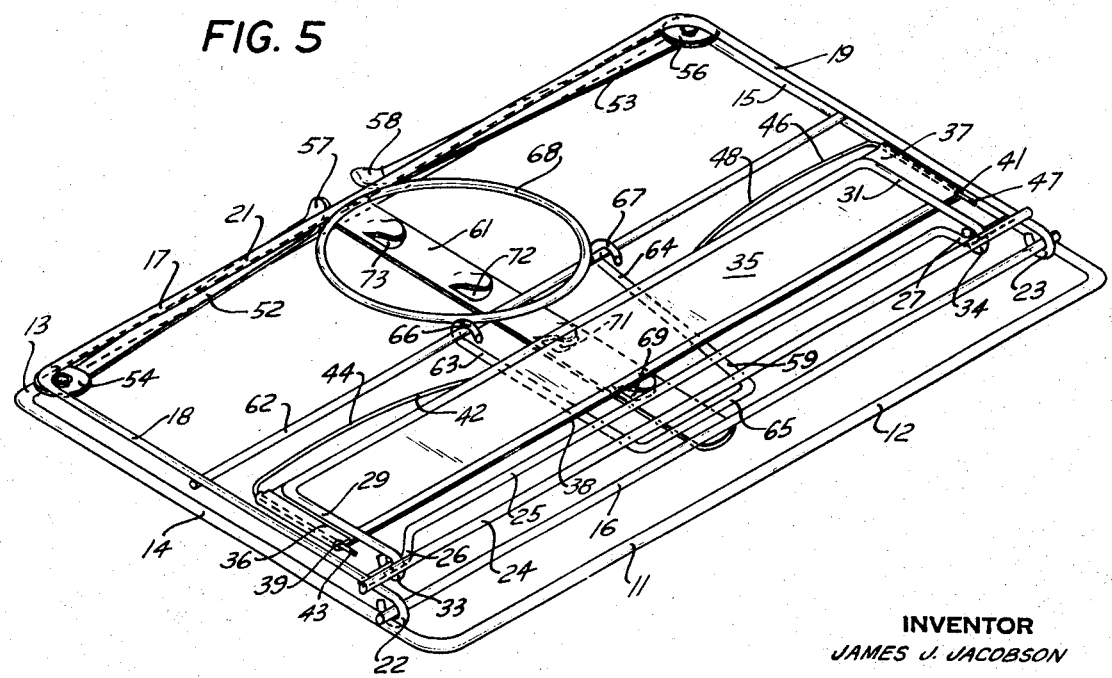
FIG. 5 is a perspective view of the embodiment of FIG. 1 in folded condition.

The base portion further comprises a substantially rigid wire support wire 16 (FIGS. 1 and 5). The support wire 16 extends parallel to the front and back sides 12 and 13 of the wire 11. The support wire 16 is affixed at one end to the left side 14 of the wire 11 and at the other end to the right side 15 of said wire at a large distance, of approximately 6/7 the length of said left or right side, from the back side 13 of said wire and at a small distance, of approximately 1/7 the length of said left or right side, from the front side 12 of said wire.

The book supporting portion of the foldable reading stand of the present invention comprises a book back supporting wire structure rotatably mounted on the base portion and a book bottom supporting part rotatably mounted on the book back supporting wire structure. The book back supporting structure of the book supporting portion comprises a substantially rigid wire 17 of U-shaped configuration (FIGS. 1 and 5).

Figure 2:
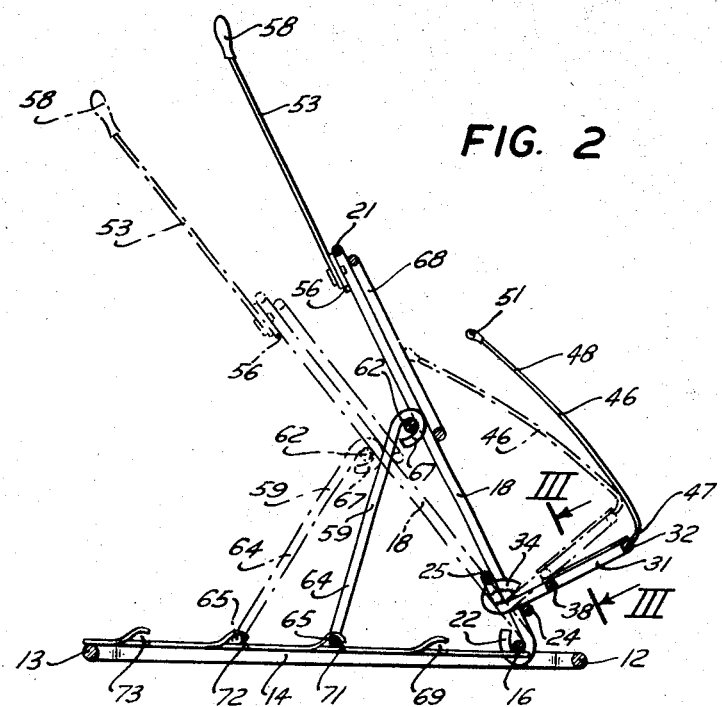
FIG. 2 is a view, partly in section, taken along the lines II—II of FIG. 1.

The U-shaped wire 17 of the book back supporting structure has a pair of spaced parallel legs 18 and 19 joined by a cross arm 21 at rounded corners (FIGS. 1 and 5). The left leg 18 of the wire 17 at its free end is folded over on itself around the support wire 16 of the base portion adjacent the left side 14 of said base portion to form a closed loop 22 (FIGS. 1, 2 and 5). The right leg 19 of the wire 17 at its free end is folded over on itself around the support wire 16 of the base portion adjacent the right side 15 of said base portion to form a closed loop 23 (FIG. 5). The closed loops 22 and 23 permit free rotation of the book supporting portion about the support wire 16.

A substantially rigid first bottom wire 24 (FIGS. 1, 2 and 5) extends parallel to the cross arm 21 of the book back wire 17. The first bottom wire 24 is affixed at one end to the left leg 18 of the book back wire 17 adjacent the loop 22 formed therein at a front surface segment of said leg. The first bottom wire 24 is affixed at its other end to the right leg 19 of the book back wire 17 adjacent the loop 23 formed therein at a front surface segment of said leg corresponding to the front surface segment of the leg 18. The positioning of the closed loops 22 and 23 adjacent the left side 14 and the right side 15, respectively, of the base portion prevents slippage in directions along the support wire 16 of the book supporting portion.

A substantially rigid second bottom wire 25 (FIGS. 1, 2 and 5) extends parallel to the first bottom wire 24. The second bottom wire 25 is affixed at one end to the left leg 18 of the book back wire 17 adjacent and slightly farther distant than the first bottom wire 24 from the loop 22 formed therein and at a back surface segment of said leg. The second bottom wire 25 is affixed at its other end to the right leg 19 of the book back wire 17 adjacent and slightly farther distant than the first bottom wire 24 from the loop 23 formed therein and at a back surface segment of said leg corresponding to the back surface segment of the leg 18.

The second bottom wire 25 is bent to form an angle 26 in itself near the left leg 18 of the book back wire 17 and is bent to form an angle 27 in itself near the right leg of said book back wire (FIGS. 1 and 5). The angles 26 and 27 bent in the second bottom wire 25 prevent slippage in directions along said wire of the book bottom supporting part.

The book bottom supporting part of the book supporting portion comprises a substantially rigid wire 28 of U-shaped configuration (FIGS. 1 and 5). The U-shaped wire 28 of the book bottom supporting part has a pair of spaced parallel legs 29 and 31 joined by a cross arm 32 at rounded corners (FIGS. 1 and 5). The left leg 29 of the wire 28 at its free end is folded over on itself around the second bottom wire 25 of the book back supporting structure between the angle 26 formed therein and the corresponding left leg 18 of said book back supporting structure to form a closed loop 33 (FIGS. 1 and 5). The right leg 31 of the wire 28 at its free end is folded over on itself around the second bottom wire 25 of the book back supporting structure between the angle 27 formed therein and the corresponding right leg 19 of said book back supporting structure to form a closed loop 34 (FIGS. 1, 2 and 5). The closed loops 33 and 34 permit free rotation of the book bottom supporting part between the plane of the book back supporting structure and the points of contact of the legs 29 and 31 of said book bottom supporting part and the first bottom wire 24 of said book back supporting structure, as shown in FIG. 2.

A sheet of material 35 (FIGS. 1, 2, 3 and 5) of suitable type such as, for example, thin metal or plastic of substantially rigid characteristics. The sheet of material 35 is affixed to the wire 28 of the book bottom supporting part and extends beyond the left leg 29 of said wire in a left extending part 36 (FIGS. 1 and 5) and extends beyond the right leg 31 of said wire in a right extending part 37 (FIGS. 1, 3 and 5). A substantially rigid reinforcing wire 38 (FIGS. 1, 2, 3 and 5) is affixed at one end to the left leg 29 and is affixed at the other end to the right leg 31 of the wire 28 of the book bottom supporting part and extends along the back edge of the sheet of material 35 parallel to the cross arm 32 of said wire. The front edge of the sheet of material 35 is affixed to the cross arm 32 of the wire 28 and the back edge of said sheet of material is affixed to the reinforcing wire 38.

The sheet of material 35 of the book bottom supporting part is folded over on itself at its left edge, which is the edge of the left extending part 36, extending beyond the left leg 29 of said book bottom supporting part, to form a closed sleeve 39 (FIGS. 1 and 5). The sheet of material 35 is folded over on itself at its right edge, which is the edge of the right extending part 37, extending beyond the right leg 31 of the book bottom supporting part, to form a closed sleeve 41 (FIGS. 1, 3 and 5).

A left page arrestor 42 (FIGS. 1 and 5) comprises bendable wire of substantially L-shaped configuration with one leg 43 thereof pivotally mounted in the sleeve 39 formed in the left extending part 36 of the sheet of material 35. The other leg 44 of the left page arrestor 42 abuts and applies page holding pressure to the left page of an open book 45 resting on the book supporting portion (FIG. 1) to arrest asid left page in open position. A right page arrestor 46 (FIGS. 1, 2, 3 and 5) comprises bendable wire of substantially L-shaped configuration with one leg 47 (FIGS. 2, 3 and 5) thereof pivotally mounted in the sleeve 41 formed in the right extending part 37 of the sheet of material 35. The other leg 48 of the right page arrestor 46 abuts and applies page holding pressure to the right page of an open book 45 resting on the book supporting portion (FIG. 1) to arrest said right page in open position.

Each of the page arrestors 42 and 46 may have a cover piece at its page abutting tip. The cover piece comprises any suitable material such as, for example, plastic or rubber, which prevents damage of the reading material by the tip of either of the page arrestors. Thus, the tip of the leg 44 of the left page arrestor 42 is covered by a cover piece 49 (FIG. 1) and the tip of the leg 48 of the right page arrestor 46 is covered by a cover piece 51 (FIGS. 1 and 2). The page arrestors 42 and 46 are bent in a slightly arcuate manner to adjust the pressure applied by said page arrestors to the position of the pages being arrested in open position thereby.

The page arrestors 42 and 46 are rotatable toward and away from each other from a folded inoperative position in which they are both in the plane of the sheet of material 35 to positions in which each is at any desired angle with said plane.

A pair of extension arms, which are a left extension arm 52 (FIGS. 1, 4 and 5) and a right extension arm 53 (FIGS. 1, 2 and 5), are pivotally mounted at the corners of the wire 17 of the book back supporting structure. The left extension arm 52 is pivotally mounted on a pivot base 54 affixed to the left corner of the wire 17 (FIGS. 1, 4 and 5). As shown in FIG. 4, the left extension arm 52 may be pivotally affixed to the pivot base 54 by any suitable means such as, for example, a rivet 55, which permits free rotation of said extension arm while applying sufficient pressure to prevent said extension arm from dropping from its position after it has been manually set in position.

The right extension arm 53 is pivotally mounted on a pivot base 56 affixed to the right corner of the wire 17 (FIGS. 1, 2 and 5). The right extension arm 53 is pivotally affixed to the pivot base 56 in the same manner that the left extension arm 52 is affixed to the pivot base 54. The extension arms 52 and 53 are rotatable toward and away from each other from a folded inoperative position in which they are both aligned with the cross arm 21 of the wire 17 of the book back supporting structure to positions in which each is at any desired angle with said cross arm.

Each of the extension arms 52 and 53 may have a cover piece at its tip. The cover piece may be of the same material as the cover pieces 49 and 51 of the page arrestors 42 and 46, respectively, and prevents damage of the reading material by the tip of either of the extension arms. Thus, the tip of the left extension arm 52 is covered by a cover piece 57 (FIGS. 1 and 5) and the tip of the right extension arm 53 is covered by a cover piece 58 (FIGS. 1, 2 and 5). The extension arms 52 and 53 support reading material of large size such as, for example, music sheets, newspapers, magazines and the like, which are larger than normal sized books and which are flexible enough so that they would droop over the cross arm 21 of the wire 17 of the book back supporting structure without the support provided by said extension arms.

A book back positioning device has a first member 59 (FIGS. 1, 2 and 5) mounted on the book back supporting structure and a second member 61 (FIGS. 1, 2 and 5) mounted on the base portion. The first and second members 59 and 61 cooperate with each other to position the book back supporting structure at a selected one of a plurality of angles with the plane of the base portion.

A substantially rigid intermediate wire 62 (FIGS. 1, 2 and 5) extends parallel to the cross arm 21 of the wire 17 of the book back supporting structure. The intermediate wire 62 is affixed at its left end to the left leg 18 of the book back wire 17 approximately half way between the second bottom wire 25 and the cross arm 21. The intermediate wire 62 is affixed at its right end to the right leg 19 of the book back wire 17 approximately half way between the second bottom wire 25 and the cross arm 21.

The first member 59 of the book back positioning device comprises a substantially rigid wire of U-shaped configuration having a pair of spaced paralled legs 63 and 64

(FIGS. 1 and 5) joined by a cross arm 65 (FIGS. 1 and 5) at rounded corners. The left leg 63 of the first member 59 is folded over on itself at its free end around the intermediate wire 62 of the book back supporting structure to form a closed loop 66 (FIGS. 1 and 5). The right leg 64 of the first member 59 is folded over on itself at its free end around the intermediate wire 62 of the book back supporting structure to form a closed loop 67 (FIGS. 1, 2 and 5).

The closed loops 66 and 67 permit free rotation of the first member 59 of the book back positioning device about the intermediate wire 62 of the book back supporting structure from a folded or inoperative position in which said first member is approximately in the plane of said book back supporting structure with the cross arm 65 of said first member approximately midway between the first bottom wire 24 of said book back supporting structure and the support wire 16 of the base portion to an angle of greater than 90 degrees with the plane of said book back supporting structure.

A reinforcing member 68 of substantially rigid wire (FIGS. 1, 2 and 5) in the shape of a ring is affixed to the cross arm 21 of the book back wire 17 and to the intermediate wire 62 and is positioned halfway between the left leg 18 and the right leg 19 of said book back wire. The closed loop 66 of the first member 59 is adjacent the ring member 68 on the left and the closed loop 67 of said first member is adjacent said ring member on the right. The ring member 68 thus not only reinforces the book back supporting structure, but prevents slippage of the first member 59 along the intermediate wire 62.

The second member 61 of the book back positioning device comprises a substantially rigid member parallel to the left and right sides 14 and 15 of the base portion and approximately half way between said left and right sides. The second member 61 has a plurality of transverse notches 69, 71, 72 and 73 formed therein at spaced intervals along its length (FIGS. 1, 2 and 5) for accommodating the cross arm 65 of the first member 59. The notches 69, 71, 72 and 73 are formed in any suitable manner such as, for example, tongues punched out of the second member 61 and raised above the plane of said second member.

The first member 59 and the second member 61 cooperate with each other to position the book back supporting structure at a selected one of a plurality of angles with the plane of the base portion. Thus, when the cross arm 65 of the first member 59 is accommodated in the notch 69 formed in the second member 61, the book back supporting structure is supported by the book back positioning device at an angle of approximately 75 degrees with the plane of the base portion.

When the cross arm 65 of the first member 59 is accommodated in the notch 71 (FIGS. 1 and 2) formed in the second member 61, the book back supporting structure is supported by the book back positioning device at an angle of approximately 60 degrees with the plane of the base portion. When the cross arm 65 of the first member 59 is accommodated in the notch 72 formed in the second member 61, as shown by broken lines in FIG. 2, the book back supporting structure is supported by the book back positioning device at an angle of approximately 45 degrees with the plane of the base portion. When the cross arm 65 of the first member 59 is accommodated in the notch 73 formed in the second member 61, the book back supporting structure is supported by the book back positioning device at an angle of approximately 30 degrees with the plane of the base portion.

In order to use or operate the folded reading stand of the present invention, the book back supporting structure is rotated about the support wire 16 of the base portion out of a plane parallel and closely adjacent the plane of said base portion to a desired angle with said base portion. The first member 59 of the book back positioning device is then rotated about the intermediate wire 62 of the book back supporting structure out of the plane of said book back supporting structure to an angle with said plane which is sufficient to enable the notch of the second member 61 of said book back positioning device to accommodate the cross arm 65 of said first member. The book back supporting structure is then rotated about the support wire 16 until the cross arm 65 is accommodated in the appropriate notch.

The book bottom supporting part is then rotated about the second bottom wire 25 of the book back supporting structure out of the plane of said book back supporting structure until the legs 29 and 31 of said book bottom supporting part contact the first bottom wire 24 of said book back supporting structure. Reading material is then placed, as shown in FIG. 1 by broken lines, with the bottom of said reading material resting on the sheet 35 of the book bottom supporting part and the back or front and back covers of said reading material resting against the book back supporting structure.

If the reading material is of large size, the extension arms 52 and 53 are rotated about their pivot points from substantial alignment with the cross arm 21 of the book back supporting structure, outward, away from each other, to suitable angles of close to 90 degrees with said cross arm. The page arrestors 42 and 46 are rotated about their legs 43 and 47, respectively, from substantial alignment with the plane of the sheet 35 of the book bottom supporting part, outward, away from each other, to suitable angles with said plane and positions in which their cover pieces 49 and 51, respectively, abut the reading material.

In order to fold the operated reading stand of the present invention to its folded, inoperative or transportable condition, the page arrestors 42 and 46 are rotated about their legs 43 and 47, respectively, inward, toward each other, into alignment with the plane of the sheet 35 of the book bottom supporting part. The extension arms 52 and 53 are rotated about their pivot points, inward, toward each other, into substantial alignment with the cross arm 21 of the book back supporting structure.

The book bottom supporting part is then rotated about the second bottom wire 25 of the book back supporting structure into the plane of said book back supporting structure. The cross arm 65 of the first member 59 of the book back positioning device is disengaged from the accommodating notch of the second member 61 of said book back positioning device and said first member is rotated about the intermediate wire 62 of the book back supporting structure into the plane of said book back supporting structure. The book back supporting structure is then roated about the support wire 16 of the base portion into a plane parallel and closely adjacent the plane of said base portion.

The reading stand of the present invention is shown in its operative or operating condition in FIGS. 1 and 2 and is shown in its inoperative or folded condition in FIG. 5.

While the invention has been described by means of a specific example and in a specific embodiment, I do not wish to be limited thereto, for obvious modifications will occur to those skilled in the art without departing from the spirit and scope of the invention.

What I claim is:

1. A foldable reading stand of all wire structure comprising: a base portion of wire structure; a book supporting portion of wire structure rotatably mounted on said base portion, said book supporting portion comprising a book back supporting wire structure rotatably mounted on said base portion and a book bottom supporting part rotatably mounted on said book back supporting wire structure; said base portion comprising a substantially rigid wire of rectangular configuration having a rounded corner and a substantially rigid support wire extending parallel to one pair of front and back parallel sides of side wire and affixed at its ends to corresponding ones of the other pair of left and right parallel sides of said wire perpendicular to said one pair of sides at a large distance from the back side of said wire and at a small distance from the front side of said wire; the book back supporting structure of said book supporting portion comprising a substantially rigid wire of U-shaped configuration having a pair of spaced parallel legs joined by a cross arm at rounded corners, each of said legs at its free end being folded over on itself around the support wire of said base portion adjacent the left and right sides of said base portion to form a closed loop to permit free rotation of said book supporting portion about said support wire.

2. A reading stand as claimed in claim 1, wherein the book back supporting structure of said book supporting portion further comprises a substantially rigid first bottom wire extending parallel to the cross arm of the book back wire and affixed at its ends to corresponding ones of the legs of said book back wire adjacent the loops formed therein and at a corresponding front surface segment of each of said legs and a substantially rigid second bottom wire extending parallel to said first bottom wire and affixed at its ends to corresponding ones of the legs of said book back wire adjacent and slightly farther distant from the loops formed therein and at a corresponding back surface segment of each of said legs, said second bottom wire being bent to form an angle in itself near each of the legs of said book back supporting structure.

3. A reading stand as claimed in claim 2, wherein the book bottom supporting part of said book supporting portion comprises a substantially rigid wire of U-shaped configuration having a pair of spaced parallel legs joined by a cross arm at rounded corners, each of said legs at its free end being folded over on itself around the second bottom wire of said book back supporting structure between the angle formed therein and the corresponding leg of said book back supporting structure to form a closed loop to permit free rotation of said book bottom supporting part between the plane of said book back supporting structure and the points of contact of the legs of said book bottom supporting part and the first bottom wire of said book back supporting structure.

4. A reading stand as claimed in claim 3, wherein the book bottom supporting part of said book supporting portion further comprises a sheet of material affixed to the wire of said book bottom supporting part and extending beyond the legs of said book bottom supporting part.

5. A reading stand as claimed in claim 4, wherein the sheet of material of said book bottom supporting part is folded over on itself at each of the edges of the parts thereof extending beyond the legs of said book bottom supporting part to form a closed sleeve, and further comprising a pair of page arrestors each pivotally mounted in a corresponding one of the sleeves formed in said sheet of material for applying page holding pressure, each of said page arrestors being rotatable toward and away from the other in a manner whereby each page of an open book resting on said book supporting portion is arrested in open position at a selected point thereon.

6. A reading stand as claimed in claim 5, further comprising a pair of extension arms pivotally mounted at the corners of said book back supporting structure, each of said extension arms being rotatable toward and away from the other in a manner whereby said book back supporting structure is adapted to support sheets of large size.

7. A reading stand as claimed in claim 6, wherein the book back supporting structure of said book supporting portion further comprises a substantially rigid intermediate wire extending parallel to the cross arm of the book back wire and affixed at its ends to corresponding ones of the legs of said book back wire approximately halfway between the second bottom wire and said cross arm of said book back supporting structure, and further comprising a book back positioning device having a first member rotatably mounted on the intermediate wire of said book back supporting structure and a second member affixed at one end of the support wire of said base portion and at its other end to the back side of said base portion, said first and second members cooperating with each other to position said book back supporting structure at a selected one of a plurality of angles with the plane of said base portion.

8. A reading stand as claimed in claim 7, wherein the first member of said book back positioning device comprises a substantially rigid wire of U-shaped configuration having a pair of spaced parallel legs joined by a cross arm at rounded corners, each of said legs at its free end being folded over on itself around the intermediate wire of said book back supporting structure to form a closed loop to permit free rotation of said first member about said intermediate wire, and the second member of said book back positioning device is parallel to the left and right sides of said base portion and approximately halfway between said left and right sides and has a plurality of transverse notches formed therein at spaced intervals along its length for accommodating the cross arm of said first member.

References Cited
UNITED STATES PATENTS

| | | | |
|---|---|---|---|
| 948,955 | 2/1910 | Darche et al. | 248—448 |
| 2,062,553 | 12/1936 | Campos | 248—453 |
| 3,376,009 | 4/1968 | Domino | 248—456 |

ROY D. FRAZIER, Primary Examiner

F. DOMOTOR, Assistant Examiner

U.S. Cl. X.R.

248—460